United States Patent [19]

Sund

[11] Patent Number: 5,136,832
[45] Date of Patent: Aug. 11, 1992

[54] DRAPER BELT

[76] Inventor: Lloyd P. Sund, Rte. 1, Box 75, Newburg, N. Dak. 58762

[21] Appl. No.: 601,407

[22] Filed: Oct. 22, 1990

[51] Int. Cl.$^5$ .................... A01D 57/02; A01D 89/00
[52] U.S. Cl. .................... 56/364; 24/31 B; 24/33 P; 474/255
[58] Field of Search .......... 56/364; 198/844.2; 24/31 B, 33 P, 33 L, 38; 474/253, 256, 255

[56] References Cited

U.S. PATENT DOCUMENTS

| | | | |
|---|---|---|---|
| 1,975,862 | 10/1934 | Olsen | 24/33 P |
| 2,145,455 | 1/1939 | Olsen | 24/33 P |
| 2,386,977 | 10/1945 | Reilly et al. | 24/33 P |
| 2,795,100 | 6/1957 | Sund | 56/364 |
| 2,799,177 | 7/1957 | Henson | 474/255 X |
| 3,324,991 | 6/1967 | Voss | 24/33 P |
| 3,414,123 | 12/1968 | Litt et al. | 198/844.2 |
| 3,744,095 | 7/1973 | Tomlinson | 474/255 X |
| 4,815,587 | 3/1989 | Musil | 198/844.2 |
| 4,841,718 | 6/1989 | Sund | 56/364 |
| 4,911,683 | 3/1990 | Legge et al. | 474/255 |

FOREIGN PATENT DOCUMENTS 536355 1/1959 Belgium ............... 198/844.2

Primary Examiner—William P. Neuder
Attorney, Agent, or Firm—Moore & Hansen

[57] ABSTRACT

An improved, removable beater belt for a harvesting machine is disclosed. The improved belt comprises a carcass formed of a pliant material having a pair of free ends, each free end having a plurality of dovetail segments separated by a series of dovetail recesses. The dovetail segments on each free end are disposed such that when the free ends are connected the dovetail segments are interdigitated in the dovetail recesses. A retaining pin is slidably received within a series of mutually aligned holes extending transversely through the dovetail segments.

4 Claims, 5 Drawing Sheets

DRAPER BELT

BACKGROUND OF THE INVENTION

This invention relates to grain and crop pickup implements attached to harvesting combines, and particularly to an apparatus found on these implements between the pickup and the platform of the combine which conveys harvested crop materials such as grains and beans from the grain pickup to the grain-receiving platform of a combine.

The use of a conveying apparatus as described above, known in some earlier versions as a draper belt drive assembly, intermediate a grain pickup assembly and a combine platform is long known in the harvesting field of the agriculture industry The purpose of the crop-conveying apparatus is to help move grain from the pickup assembly to the combine platform, and to prevent the grain from being inadvertently deposited on the ground behind the pickup assembly without reaching the combine platform. As illustrated in U.S. Pat. No. 2,795,100 issued to Applicant's father on Jun. 11, 1957, draper belt drive assemblies generally include two adjacent, parallel rollers with several belts wrapped about them and rotating cooperatively therewith. These belts have flexible fins or flippers which help carry grain from the pickup to the combine platform. Additionally on some draper belt drive assemblies, especially those used in harvesting dry beans or similar crops, an additional component known as a bean roller may be used to help convey bean stalks onto a combine platform.

A problem with previous styles of crop-conveying apparatus is that should draper belts need replacing due to excessive wear, for example, the entire draper belt assembly would need to be disassembled. This is so because the draper belts are wrapped about two rollers, and both rollers would need to be disassembled in order to access the draper belts to be replaced, resulting in substantial equipment down-time for the farmer. As is commonly known, this often resulted in financial losses because intervening bad weather conditions would prevent the equipment from being returned to the field and crop losses would occur.

A previously issued patent, U.S. Pat. No. 4,841,718 to Sund, the same inventor as on the present application, proposed one solution to this problem. This patent taught the use of a draper belt made of a one or two-piece construction so as to allow for clamping the piece or pieces together to form a belt, rather than requiring that belts be slid longitudinally along the roller to their proper position. Therefore it is no longer necessary to remove rollers, intermediate hardware, or other draper belts which may not need replacement.

Canadian Patent 1,252,635 to Sund, again the same inventor as on the present application, discloses another way to attach two free belt ends together. This patent teaches a belt comprising a plurality of segments, each of whose free ends are hingeably attached to another free end Each free end hinge is molded into the pliable belt carcass and is provided with a plurality of holes in the hinge portion molded within the belt segment so that the material forming the belt may interlock with the hinge to provide a secure attachment.

With this background in mind, a draper belt that is more serviceable and durable has been developed.

OBJECTS OF THE PRESENT INVENTION

It is a principal object of the present invention to provide new and improved apparatus not subject to the foregoing disadvantages.

It is another object of the present invention to provide an improved draper belt that is readily attachable to a shaft without removal of the shaft.

It is a further object of the present invention to provide an improved draper belt having a stronger attachment joint than in prior art belts.

It is yet a further object of the present invention to provide an attachment joint that is self aligning.

It is still yet a further object of the present invention to reduce harvester down-time by providing a draper belt that has a quick-attach joint.

SUMMARY OF THE INVENTION

According to the present invention there is provided an improved draper belt having a pair of free ends connectable by a quick-attach joint to form a continuous belt. Each of the free ends of the belt include a plurality of dovetails disposed thereon such that when the free ends are connected to form the quick-attach joint the dovetails are interdigitated. Each of the dovetails includes a hole extending transversely therethrough such that when the free ends are joined the holes are mutually aligned to slidably receive a retaining pin. In a preferred embodiment the retaining pin has a handle means disposed at one end thereof to facilitate insertion into the holes and removal therefrom. At least one end of the quick-attach joint has a notch in which the handle means of the retaining pin may be disposed. The improved draper belt of the present invention further includes a transition gusset extending between the carcass of the belt and the thickened dovetail segments.

As a particularly advantageous feature, the dovetail segments interlock in such a way when the free ends of the belt are connected together as to provide overlapping triangularly configured, load-bearing belt portions.

These and other objects of the present invention will become apparent to those skilled in the art when the following detailed description of the invention and claims are read in conjunction with the accompanying drawings. Throughout the specification identical reference numerals refer to identical or similar parts.

DESCRIPTION OF THE PREFERRED EMBODIMENT

Figure 1:
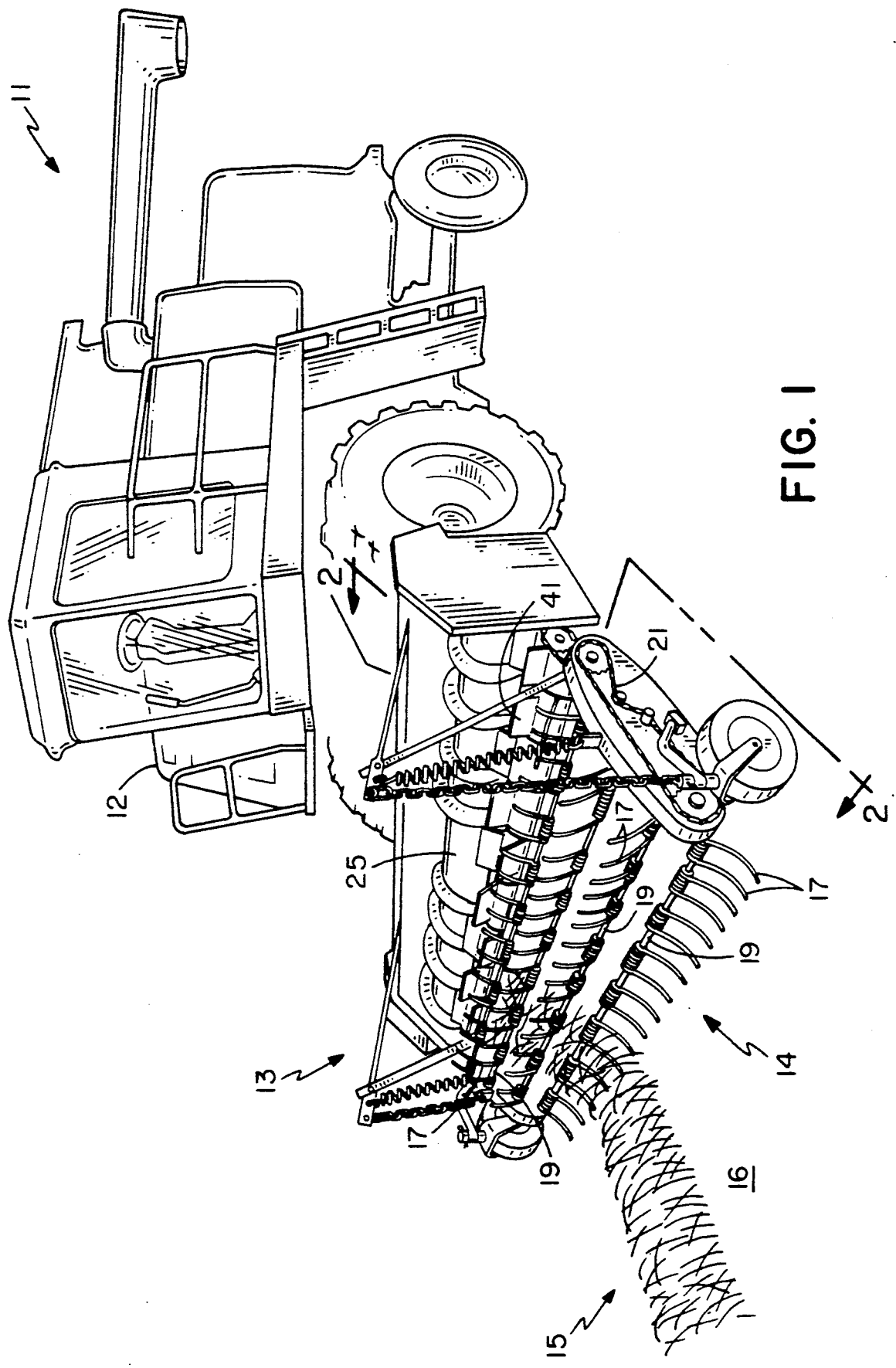
FIG. 1 is a perspective view of a harvester shown with an attached combine platform having a raking style pickup and an improved draper belt of the present invention.

FIG. 1 shows a harvester 11 upon which an improved draper belt in accordance with the present invention may find application. Harvester 11 includes a tractor portion 12 and a grain pickup portion 13 including a raking pickup 14 that picks a crop windrow 15 up off the ground 16 and conveys it rearwardly to auger 25, which transports the crop laterally into the processing apparatus of tractor 12 for further harvesting operations. Raking pickup 14 includes a plurality of shafts 19 carried at opposite ends thereof by a pair of chain drives 21. Each shaft 19 mounts a plurality of raking tines 17 that pick windrow 15 off the ground and convey it rearwardly onto a draper belt assembly 41.

Figure 2:
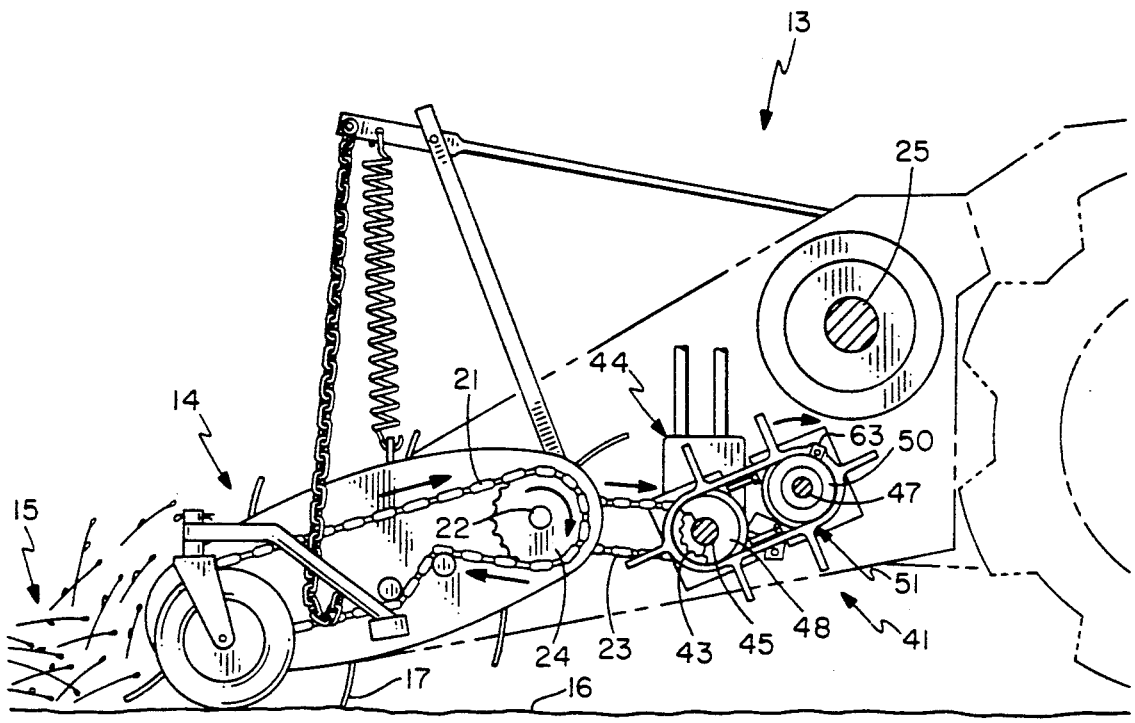
FIG. 2 is a side elevation view, partially in section, of a portion of the raking pickup, the combine platform, and the improved draper belt of the present invention taken along line 2—2 of FIG. 1.
Figure 3:
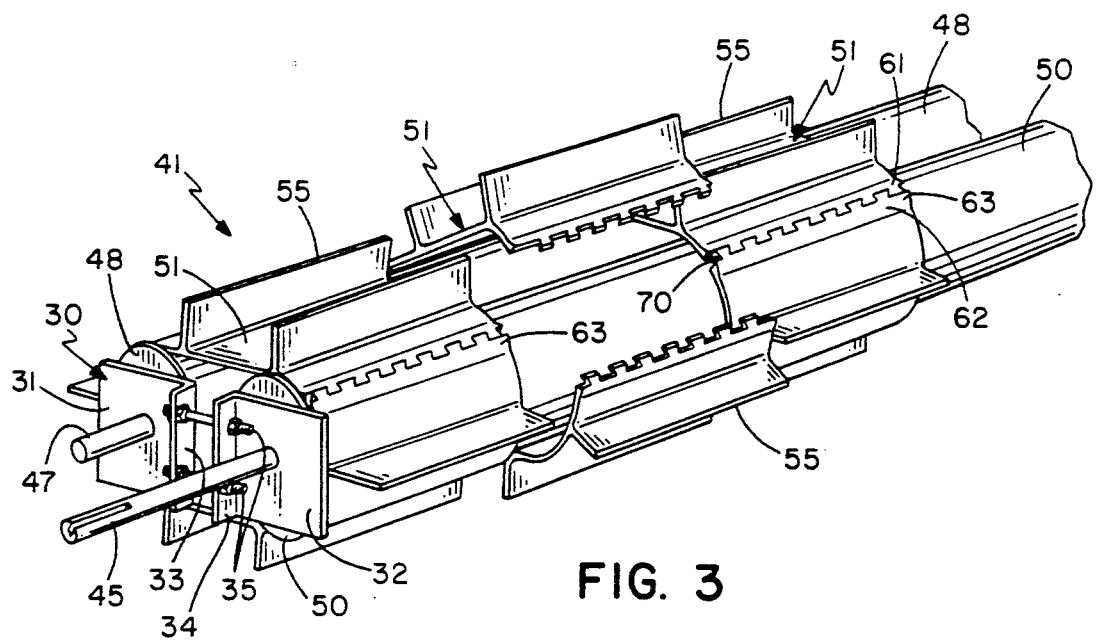
FIG. 3 is a perspective view of the draper belt assembly portion of the conveying apparatus shown in FIGS. 1 and 2.

As best seen in FIGS. 2 and 3, draper belt assembly 41 includes a pair of shafts 45 and 47 carrying spaced-apart rollers 48 and 50 about which a plurality of draper belts 51 are wrapped. Draper belts 51 abut each other at their side edges to form an elongated draper belt assembly along the lengths of rollers 48 and 50. Forward shaft 45 is driven by an hydraulic motor 44 as shown. Other mechanical means such as a belt or chain drive can also be used to drive shaft 45. Forward shaft 45 includes a drive sprocket 43 connected to a sprocket (not shown) on raking pickup shaft 22 by a drive chain 23. A drive chain 21 is driven by sprocket 24 on shaft 22 to thereby revolve shafts 19 and tines 17 mounted thereon to pick up the crop windrow 15. Draper belt assembly 41 rotates clockwise as shown in FIG. 2 to convey grain form raking pickup 14 rearwardly to auger 25. As shown in FIGS. 2 and 3, an improved draper belt 51 in accordance with the present invention, includes a quick-attach joint 63 whereby an individual draper belt 51 may be readily and quickly removed when damaged or broken and replaced without significant down-time of the harvesting equipment.

Figure 4:
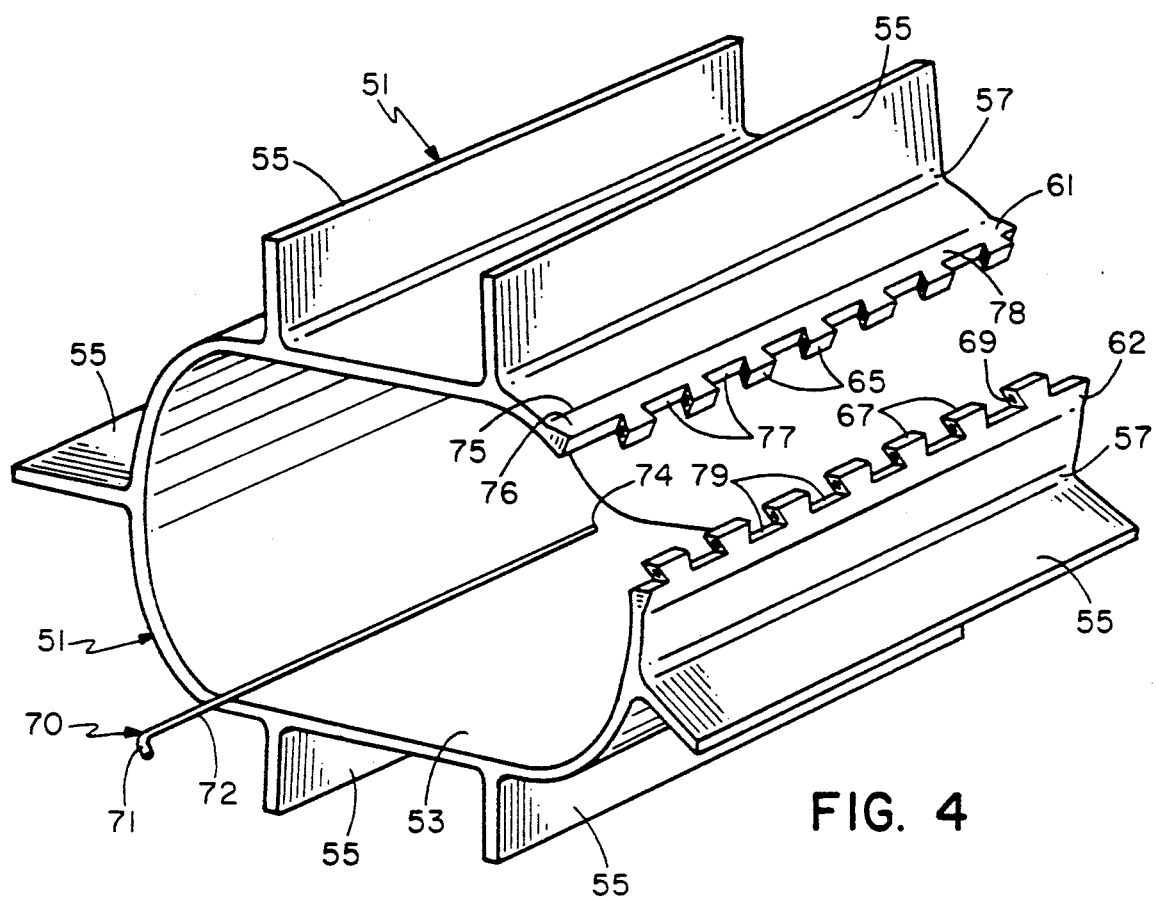
FIG. 4 is a perspective view of the draper belt of the present invention.
Figure 5:
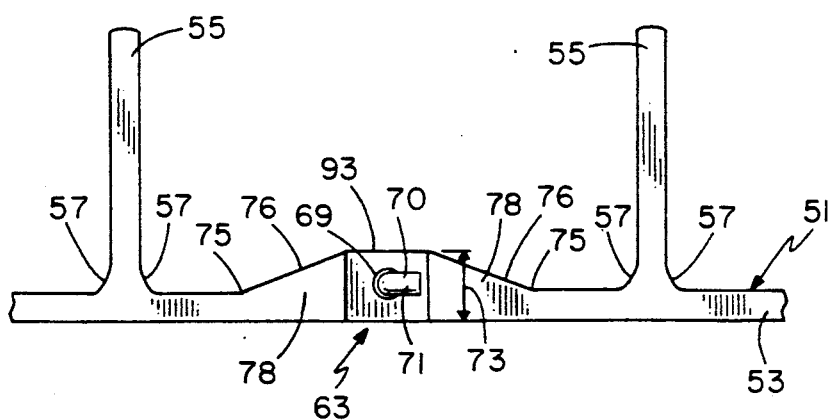
FIG. 5 is an end elevation view of the draper belt of the present invention taken along lines 5—5 of FIG. 6.
Figure 6:
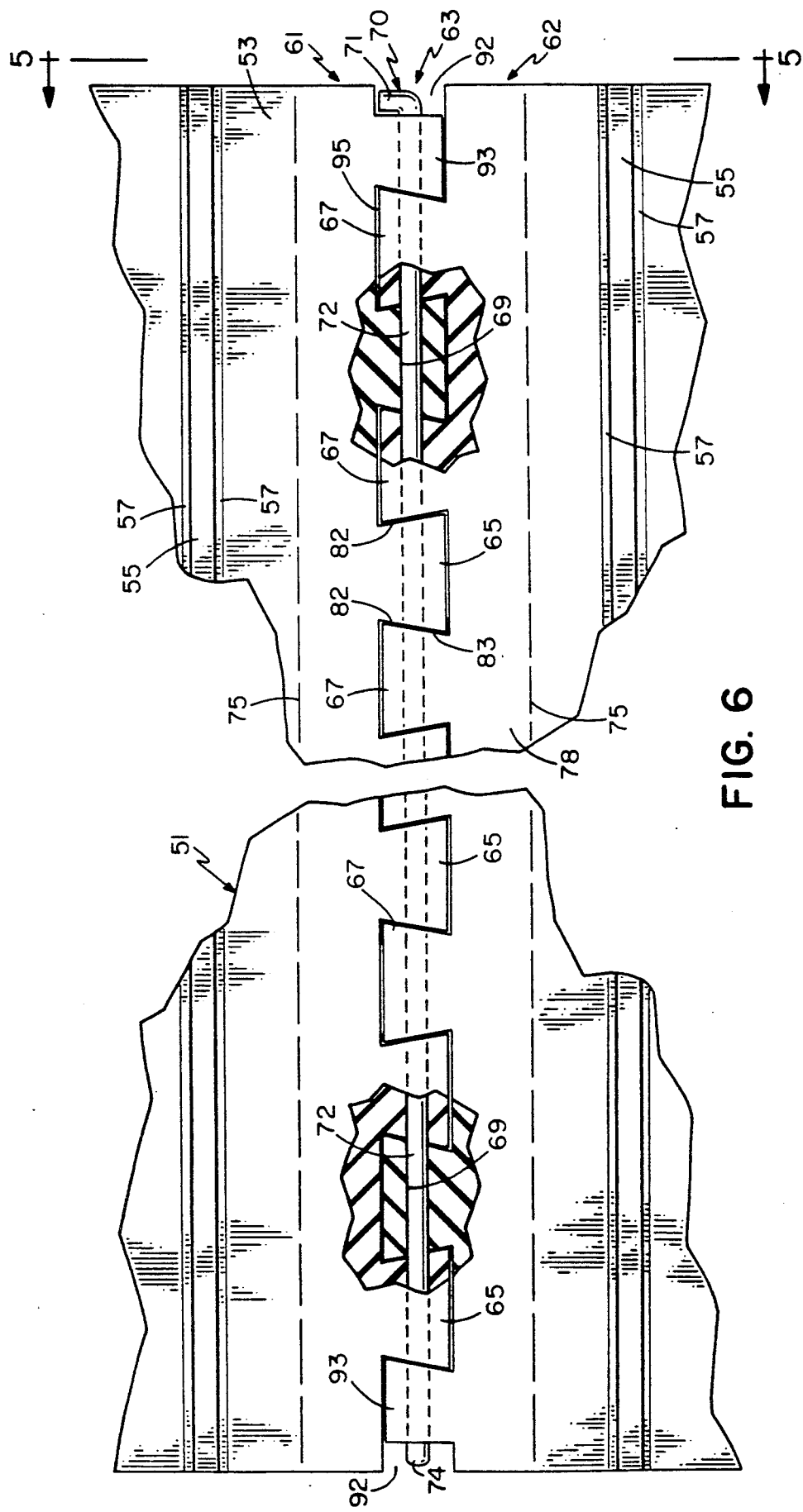
FIG. 6 is a top plan view of the quick-attach joint of a draper belt of the present invention, partially broken away for clarity.

With reference now to FIGS. 4, 5, and 6 an improved draper belt 51 includes a belt carcass 53 formed of a pliant material carrying a plurality of fins or flippers 55. Each fin 55 is supported on each side thereof by a fin gusset 57 extending between carcass 53 and the fin. Gussets 57 function to reduce stress and to strengthen fins 55, thereby enabling them to withstand the rigors of harvesting operations. Belt 51 has a first free end 61 and second free end 62 carrying a first plurality of dovetail segments 65 and a second plurality of dovetail segments 67, respectively. First and second dovetail segments 65 and 67 are separated along the length of first and second free ends 61 and 62, respectively, by dovetail recesses 77 and 79 such that when the free ends are connected, the dovetails 65 and 67 are interdigitated in recesses 79 and 77, respectively, to form joint 63. Each dovetail 65 and 67 has a hole 69 extending transversely therethrough such that when free ends 61 and 62 are connected to form joint 63, the holes are in mutual alignment. A pin 70 including a pin handle means 71 and a pin shaft 72 is slidably receivable within holes 69 when free ends 61 and 62 are connected to form quick-attach joint 63.

Dovetails 65 and 67 have a general configuration of a truncated triangle, i.e., a triangular frustum. Each dovetail 65 and 67 has a thickness 73 greater than that of the thickness of carcass 53, as best seen in FIG. 5. A thickened dovetail transition gusset 78 extends from a transition line 75 between carcass 53 and thickened dovetail segments 65 and 67 along each of the belt free ends 61 and 62 to reduce stress and further reinforce joint 63. Transition gussets 78 flare outwardly towards dovetails 65 and 67 of free ends 61 and 62 along angled outer surfaces 76 thereof.

As shown in FIG. 6, a notch 92 is disposed at each end of joint 63 for receiving pin handle means 71. Notch 92 is formed by reducing the width of the end dovetail 93. Notch 92 allows pin 70 to be fully inserted within hole 69 and to be out of running interference with adjoining belts. Pin handle means 71 also functions to prevent pin 70 from sliding within hole 69. Comparing FIG. 4 with FIG. 6, it can be seen that prior to inserting pin 70 into holes 69, that only one end of the pin is bent to form handle means 71. Obviously, the end 74 first being inserted cannot be bent or insertion would be impossible. After pin 70 is inserted fully, as shown in FIG. 6, end 74 can be bent with a pliers or similar tool so as to retain pin 70 within joint 63.

Pin 70 and holes 69 have a substantially circular cross section. Other shapes may be used however and the present invention does not depend upon such shapes. I may be desired, for example, to have pin 70 and holes 69 configured as polygons in cross section to prevent pin rotation in the joint.

Figure 7:
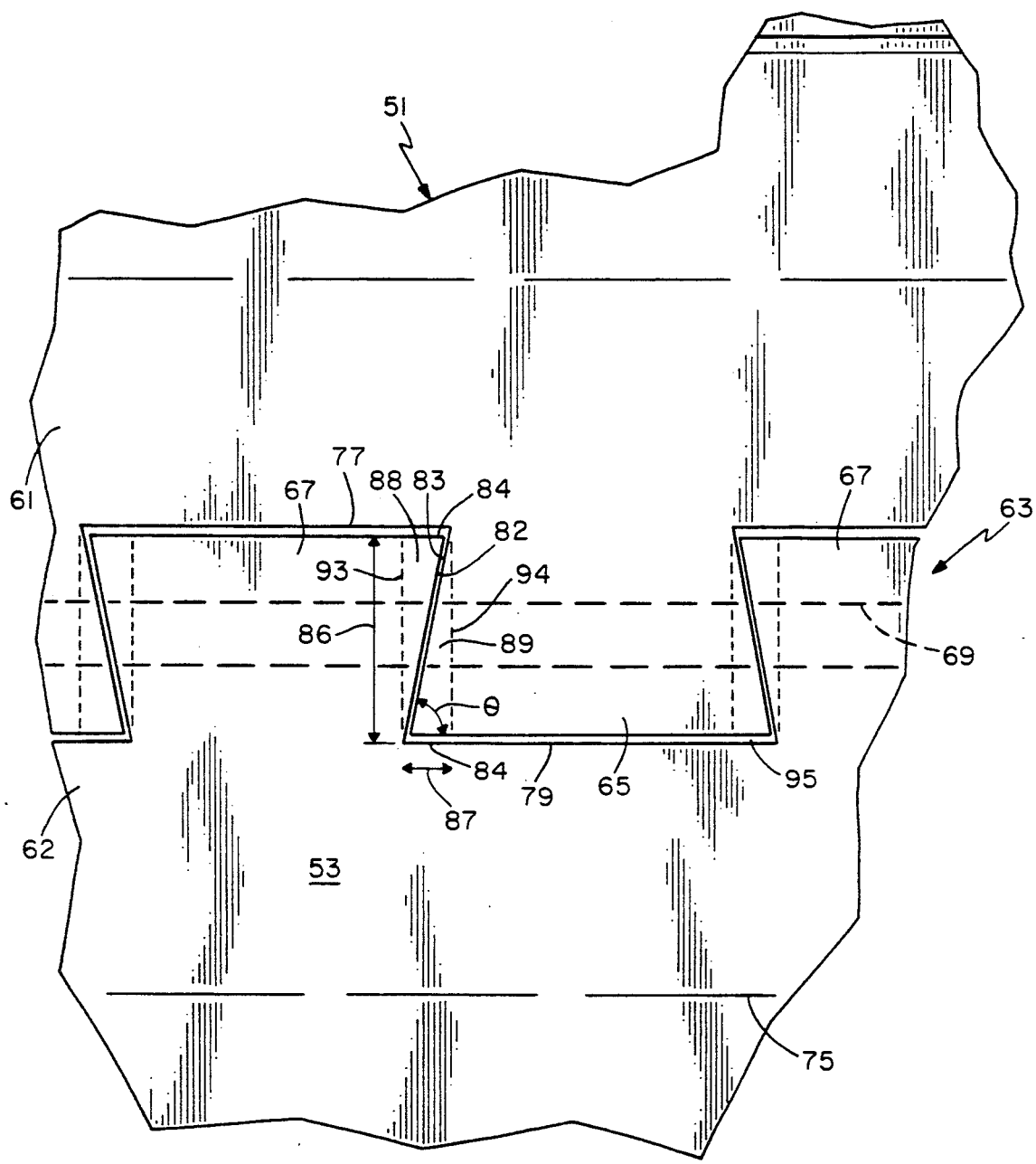
FIG. 7 is an enlarged, fragmentary view of overlapping load-bearing dovetail sections of an improved draper belt.

As best seen in FIG. 7, joining free ends 61 and 62 to form joint 63 creates overlapping, triangular belt portions 88 and 89 in adjoining dovetail segments 65 and 67. Overlapping sections 88 and 89 serve to directly absorb the loads created by tightening belt 51 for operation. As shown in FIG. 7, overlapping section 88 comprises a cross-sectional area defined by side 82 of dovetail 67, triangle base 84, and side 93, which is equal to height 86 of the overlapping region. Similarly, overlapping section 89 is defined by side 83 of dovetail 65, base 84, and side 94, which is again equal to the height 86 of the overlapping region. The improved draper belt of the present invention thus absorbs the forces at the joint through use of both the pin 70 extending through the holes 69 in the individual dovetail sections and the overlapping triangular sections. In prior art belts such as those referenced above, the entire load at the joint would be transmitted through the belt perpendicular to the direction of extent of the joint. Through the use of the overlapping portions of the dovetail joint of the present invention, a portion of the load forces is transmitted in a direction indicated by double headed arrow 87 parallel to the joint, thereby reducing the overall load on the joint and thus reducing stress on the joint. This in turn reduces the wear and tear on the joint and provides for a longer-lasting joint than those of the prior art. The extent of overlap dependant upon the angle theta ($\theta$) as indicated in FIG. 7 and can be varied depending upon the material. It has been found for example that with a belt comprising a material known as Dupont Alcryn ® rubber a desirable amount of overlap across the entire width of the belt is approximately 25 percent. That is, the overlapping triangular sections form an area equal to approximately 25 percent of the area covered by the interdigitated dovetail segments.

FIGS. 6 and 7 show a gap 95 between the corresponding portions of free ends 61 and 62. It should be noted that gap 95 has been shown greatly exaggerated for purposes of clearly illustrating the various features of belt 51 and that in practice free ends 61 and 62 will be in a closely abutting relationship.

In addition to providing the additional joint strength referred to, the draper belt of the present invention provides a readily attachable belt when needed. Should an existing belt 51 on draper belt assembly 41 need replacement, the operator of harvester 11 need only loosen adjustment means 30. Means 30 includes plates 31 and 32 through which shafts 45 and 47 extend. Plates 31 and 32 each include an opposed flange 33 and 34, respectively, through which bolts 35 extend. By loosening the nuts threaded onto bolts 35, plates 31 and 32 may be moved relative to each other either closer or farther away. Consequently, shafts 45 and 47 are relatively movable and can be moved closer together to facilitate removal of the belts. The old belt, if it hasn't broken off and been lost in the field, can be removed by withdrawing the retaining pin 70 and disengaging the dovetailed free ends 61 and 62 of the belt from each other. A replacement belt can be quickly placed around the rollers 48 and 50 such as is shown in FIG. 3, the ends can be joined by snapping the dovetail segments 65 and 67 into mating recesses 77 and 79, and a retaining pin inserted through the holes 69. By use of adjustment means 30 shafts 45 and 47 can be moved farther away from each other and, thus, the belt assembly can be tightened and the harvester operator is once again ready to pursue his harvesting operations.

It is anticipated that various changes, substitutions, and modifications, in the size, shape, and arrangement of the improved draper belt assembly disclosed herein may now suggest themselves to those skilled in the art, all of which fall within the spirit and scope of the present invention. Accordingly, it is intended that the invention be limited only by the scope of the appended claims.

What is claimed is:

1. A draper belt for harvesting machines, said belt having a quick attach joint and comprising a carcass formed of a pliant material and a plurality of fins attached thereto, said belt having a first and a second free end connectable to each other to form said joint, said first free end including a first plurality of dovetail segments separated by a series of dovetail recesses and said second free end including a second plurality of dovetail segments separated by a second series of dovetail recesses, wherein:

said belt is defined in part by a carcass thickness and wherein said dovetail segments have thickness greater than the thickness of said carcass for strengthening said quick attach joint, said belt including a transition gusset for strengthening said quick attach joint, said transition gusset extending between said belt carcass and said free ends and increasing in thickness from transition juncture lines with said belt carcass toward said dovetail segments; and wherein;

each of said dovetail segments of said first and second pluralities includes a through hole extending transversely therethrough, said holes being in mutual alignment when said free ends are connected; and said draper belt further includes a retaining pin slidingly receivable in said mutually aligned holes for retaining said free ends in said quick attach joint;

said first and second pluralities of dovetail segments disposed on said first and second free ends respectively such that when said free ends are connected said pluralities of dovetail segments are interdigitated in said dovetail recesses to form overlapping, load-absorbing belt portions in said quick attach joint, said free ends being retained in said quick attach joint solely by said interdigitated dovetail segments and said retaining pin.

2. The draper belt of claim 1 wherein:

said retaining pin is defined in part by a longitudinal pin shaft and includes a handle means extending from an end of said pin shaft at an angle thereto to facilitate insertion and removal of said pin from said mutually aligned holes; and said quick joint includes a notch at one end of said joint formed in juxtaposed end portions of said belt free ends for receiving and disposing said pin handle means out of running interference with other equipment or belts.

3. A harvester apparatus of the type having material pickup means on the forward end thereof and a draper belt assembly, said assembly being mounted rearwardly of said pickup means on a pair of rotating shafts disposed on said harvester apparatus and comprising a plurality of draper belts mounted around said shafts along the lengths thereof in abutting engagement with each other, each said draper belt comprising a carcass formed of a pliant material and a plurality of fins extending outwardly therefrom, each said belt having a first free end and a second free end connectable to each other to form a quick-attach joint, said first free end including a first plurality of dovetail segments separated by a plurality of dovetail recesses and said second free end including a second plurality of dovetail segments separated by a second plurality of dovetail recesses, wherein:

each of said dovetail segments of said first and second pluralities includes a through hole extending transversely therethrough, said holes being in mutual alignment when said free ends are connected;

each said draper belt further includes a retaining pin slidingly received in said mutually aligned holes on each of said belts for retaining said free ends in said quick-attach joints, said retaining pin being defined in part by a longitudinal pin shaft and including a handle means extending from an end of said pin shaft at an angle thereto to facilitate insertion and removal of said pin from said mutually aligned holes; and each said quick-attach joint further includes a notch at an end of said quick-attach joint formed in juxtaposed end portions of said belt free ends for receiving and disposing said retaining pin handle means out of running interference with other equipment or belts, whereby each of said belts may be independently removed and replaced;

wherein said first and second pluralities of dovetail segments are disposed on said first and second free ends respectively such that when said free ends are connected, said pluralities of dovetail segments are interdigitated in said plurality of dovetail recesses to form overlapping, load-absorbing belt portions in said quick attach joint, said free ends being retained in said quick attach joint solely by said interdigitated dovetail segments and said retaining pin.

4. The harvester apparatus of claim 3 wherein:

each of said belts is defined in part by a carcass thickness and wherein said dovetail segments have a thickness greater than the thickness of said carcass for strengthening said belt joints, said through holes extending through said thickened dovetail sections; and said belt includes a transition gusset extending between said belt carcass and said dovetail segments, said transition gussets flaring outwardly from transition juncture lines with said belt carcass toward said dovetail segment.

* * * * *

UNITED STATES PATENT AND TRADEMARK OFFICE
CERTIFICATE OF CORRECTION

PATENT NO. : 5,136,832

DATED : August 11, 1992

INVENTOR(S) : Lloyd P. Sund

It is certified that error appears in the above-identified patent and that said Letters Patent is hereby corrected as shown below:

Column 4, line 23, delete "I" and substitute --It-- therefor.

Column 3, line 35, delete "form" and substitute --from-- therefor.

Signed and Sealed this

Twenty-first Day of September, 1993

*Attest:*

BRUCE LEHMAN

*Attesting Officer*  *Commissioner of Patents and Trademarks*